(12) United States Patent
Cook

(10) Patent No.: US 8,786,242 B2
(45) Date of Patent: Jul. 22, 2014

(54) METHOD AND DEVICE FOR CONTROLLING LOAD AND VOLTAGE IN VOICE COILS

(75) Inventor: Daniel S. Cook, Terryville, CT (US)

(73) Assignee: Enfield Technologies, LLC, Trumbull, CT (US)

( * ) Notice: Subject to any disclaimer, the term of this patent is extended or adjusted under 35 U.S.C. 154(b) by 1394 days.

(21) Appl. No.: 12/380,604

(22) Filed: Feb. 26, 2009

(65) Prior Publication Data

US 2009/0212729 A1    Aug. 27, 2009

Related U.S. Application Data

(60) Provisional application No. 61/067,444, filed on Feb. 27, 2008.

(51) Int. Cl.
  *G05B 11/28*    (2006.01)
(52) U.S. Cl.
  USPC ............ 318/599; 318/606; 318/456; 318/474
(58) Field of Classification Search
  USPC ............ 318/599, 456, 474, 400.22, 711, 714,
        318/715, 719, 720, 603, 606, 293, 490,
        318/503; 388/811
  See application file for complete search history.

(56) References Cited

U.S. PATENT DOCUMENTS

| | | | | |
|---|---|---|---|---|
| 3,243,677 A | * | 3/1966 | Cannalte et al. | 318/400.01 |
| 4,841,207 A | * | 6/1989 | Cheyne | 388/811 |
| 5,460,201 A | | 10/1995 | Borcea et al. | 137/625.65 |
| 5,672,950 A | * | 9/1997 | Kemp et al. | 318/801 |
| 5,828,193 A | * | 10/1998 | Furuta | 318/400.08 |
| 5,960,831 A | | 10/1999 | Borcea et al. | 137/625.65 |
| 6,388,417 B1 | * | 5/2002 | Keith | 318/701 |
| 6,455,839 B1 | * | 9/2002 | O'Connor et al. | 250/221 |
| 6,580,260 B2 | | 6/2003 | Takita | 323/299 |
| 6,801,009 B2 | * | 10/2004 | Makaran et al. | 318/599 |
| 6,934,140 B1 | | 8/2005 | Rober et al. | 631/154 |
| 7,067,941 B2 | * | 6/2006 | Honda et al. | 307/412 |
| 7,157,874 B2 | * | 1/2007 | Nomura et al. | 318/432 |
| 7,202,622 B2 | * | 4/2007 | Eskritt et al. | 318/400.24 |
| 7,323,839 B1 | * | 1/2008 | Chen et al. | 318/268 |
| 7,401,541 B2 | | 7/2008 | McCarroll et al. | 91/392 |

(Continued)

OTHER PUBLICATIONS

Data sheet SLOS401A, Sep. 2002 (revised Oct. 2002) for the DRV593/DRV594 from Texas Instruments, 23 pgs.

(Continued)

*Primary Examiner* — Bentsu Ro
*Assistant Examiner* — Thai Dinh
(74) *Attorney, Agent, or Firm* — Harrington & Smith

(57) ABSTRACT

A method for sensing and compensating for variances in load and voltage in a closed loop voice coil system is described. A load in a system which included a supply voltage and the load, which includes an inductive element, is excited with a known duty cycle for a time interval. At an end time, at the end of the time interval, the current which flows through the load is sensed. A lumped term based at least in part on the time interval and a change in the load current during the time interval is calculated. The lumped term is representative of the supply voltage and one or more electrical characteristic of the load. A control signal to control a voltage applied to the load may be generated based at least in part on the lumped term. Apparatus and computer-readable media are also described.

15 Claims, 6 Drawing Sheets

(56) References Cited

U.S. PATENT DOCUMENTS

| | | | |
|---|---|---|---|
| 7,486,080 B2 * | 2/2009 | Foll et al. | 324/522 |
| 2005/0092952 A1 | 5/2005 | McCarroll et al. | 251/129.18 |
| 2008/0099705 A1 | 5/2008 | Cook et al. | 251/129.01 |
| 2009/0001305 A1 | 1/2009 | Cook et al. | 251/129.15 |

OTHER PUBLICATIONS

Data sheet SBOs120, entitled "INA-145" and subtitled "Programmable Gain Difference Amplifier" (Mar. 2000 printing date), from Burr-Brown, 13 pgs.

Data Sheet DS39598E, entitled "PIC16F818/819 Data Sheet" and subtitled "18/20-Pin Enhanced Flash Microcontrollers with nano Watt Technology" (2004), from Microchip. 176 pgs.

Data sheet 29319.37H, entitled "3959" and subtitled DMOS Full-Bridge PWM Motor Driver (no date given), from Allegro Microsystems, Inc., 12 pgs.

Data Sheet SBOS105, entitled "INA157" and subtitled "High-Speed, Precision Difference Amplifier", (Mar. 1999 printing date), from Burr-Brown, 10 pgs.

* cited by examiner

METHOD AND DEVICE FOR CONTROLLING LOAD AND VOLTAGE IN VOICE COILS

CROSS-REFERENCE TO RELATED APPLICATIONS

This patent application claims priority under 35 U.S.C. §119(e) from U.S. Provisional Patent Application No. 61/067,444, filed Feb. 27, 2008, the disclosures of which is incorporated by reference herein in its entirety.

TECHNICAL FIELD

The exemplary embodiments of this invention relate generally to electrically controlled coils and, more specifically, relate to sensing and compensating for variances in load and voltage in a closed loop voice coil current controller.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Inductive elements where the inductance and/or resistance may not be known or may vary include such elements as DC motors, solenoids, and voice coils. These elements are inherently inductive which means that changes in an applied coil voltage do not instantaneously result in a change in the coil current. The ability to change the coil current quickly is important in order to quickly control the voice coil mechanical elements.

In a voice coil-actuated pneumatic valve, it is important that current be accurately controlled in order to accurately control the valve. Stability and transient response of the valve current are closely related to the electrical load (i.e., inductance and resistance of the voice coil) as well as to the voltage of the power supply. Controller gains that lead to acceptable performance for one voice coil and supply voltage, therefore, may yield highly unsatisfactory performance for another.

In general, classical solutions to compensate for an uncertain plant or load, in a control system would lead to increased system complexity. For a minimal closed-loop current controller, only current must be sensed and used as feedback. Another, simple way of compensating for power supply voltage and load is to sense power supply voltage directly. Power supply voltage feedback, in conjunction with load current feedback, can be used in the controller for compensation. The disadvantage to this method is that using it would require an additional sensing circuit (which would consume microcontroller peripherals, printed circuit board space, and add complexity to the circuit design), as well as a load-identification algorithm.

An additional classical solution to this problem would be to make the current controller tunable (or selectable) by the user, thereby allowing for a wide range of loads and power supplies. Unfortunately, this adds another step for the user before the controller can be used. Also, since this method is not automatic, such a controller must be re-tuned when used in a system with a different set of parameters, for instance, if the power supply voltage or voice-coil parameters change.

Due in part to manufacturing variances in voice coil motor construction, broad offerings of products with voice coil motors of different characteristics, and the need to allow the customer the ability to operate voice coil products with a wide range of supply voltages, there is a need for a voice coil controller which can accommodate a wide range of loads and power supplies without re-tuning when used in a new system. Such a controller should automatically operate to a given set of specifications for many different power supply voltages and loads.

SUMMARY

The below summary section is intended to be merely exemplary and non-limiting.

The foregoing and other problems are overcome, and other advantages are realized, by the use of the exemplary embodiments of this invention.

In an exemplary embodiment in accordance with this invention is a method for sensing and compensating for variances in load and voltage in a closed loop voice coil current controller. The method includes exciting a load in a system including a load and a supply voltage with a known duty cycle for a time interval following a start time. The load includes an inductive element. At an end of the time interval, sensing, at an end time, an end load current which flows through the load is also included in the method. The method also includes calculating a lumped term based at least in part on the time interval and a change in the load current during the time interval. The lumped term is representative of the supply voltage and one or more electrical characteristic of the load.

A further exemplary embodiment in accordance with this invention is an apparatus for sensing and compensating for variances in load and voltage in a closed loop voice coil current controller. The apparatus includes an input configured to receive a detected current flowing through a load of a system, where the load comprises an inductive element. An output configured to provide a signal configured to excite the load is also included in the apparatus. The apparatus includes a controller configured to: excite the load with a known duty cycle for a time interval following a start time; at an end time at an end of the time interval, receive a sensed end current flowing through the load; and calculate a lumped term based at least in part on the time interval and a change in the load current during the time interval. The lumped term is representative of the supply voltage and at least one electrical characteristic of the load.

An additional exemplary embodiment in accordance with this invention is a computer-readable medium tangibly encoding a computer program comprising program instructions, execution of the program instructions resulting in operations for sensing and compensating for variances in load and voltage in a closed loop voice coil current controller. The instructions include exciting a load in a system including a load and a supply voltage with a known duty cycle for a time interval following a start time. The load includes an inductive element. At an end of the time interval, sensing, at an end time, an end load current which flows through the load is also included in the instructions. The instructions also include calculating a lumped term based at least in part on the time interval and a change in the load current during the time interval. The lumped term is representative of the supply voltage and one or more electrical characteristic of the load.

A further embodiment in accordance with this invention is an apparatus for sensing and compensating for variances in load and voltage in a closed loop voice coil current controller. The apparatus includes means for exciting a load in a system including a load and a supply voltage with a known duty cycle for a time interval following a start time. The load includes an inductive element. A means for sensing, at an end of the time interval, at an end time, an end load current which flows through the load is also included in the apparatus. The apparatus also includes means for calculating a lumped term based at least in part on the time interval and a change in the load current during the time interval. The lumped term is representative of the supply voltage and one or more electrical characteristic of the load.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Exemplary embodiments of this invention solve at least the above described problems. A voice coil controller in accordance with an exemplary embodiment of this invention makes it possible to detect the electrical characteristics of the inductive load or voice coil inclusive of the amplifier by calculating a lumped term that accounts for resistance, inductance, and supply voltage. This lumped term is then used to modify the control algorithm so that the dynamic performance of the controlled variable (e.g., current) is sufficiently consistent for many different motor designs and supply voltages. The current response may be identical for all combinations of load inductance, load resistance, and supply voltage. Said voice coil controller also simplifies hardware design and enables the same coil control/drive electronics to be used with multiple motors and under a wide range of supply voltages.

Such a controller in accordance with an exemplary embodiment of this invention may be used to drive a wide variety of voice-coil actuators, while offering the designer and customer flexibility on power supply requirements. Furthermore, a controller with these features does not add to system hardware complexity, as no additional hardware costs need be incurred.

While reference is made to voice coils, exemplary embodiments of the invention may apply as well to any inductive element such as elements as a DC motor, or a solenoid.

Technical Description of an Exemplary Embodiment

Figure 1:
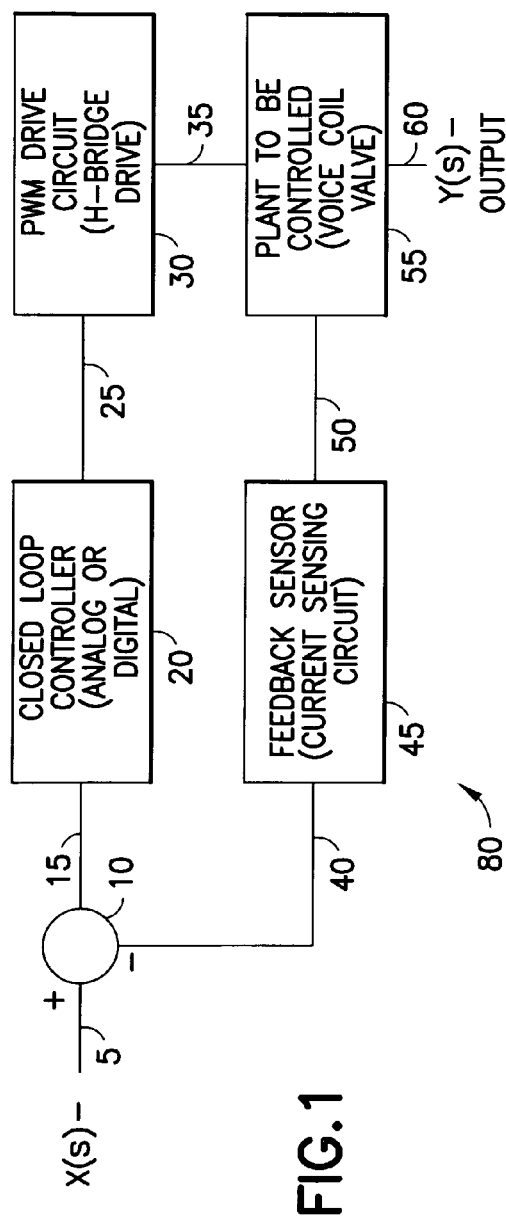
FIG. 1 depicts a simplified block diagram of a controller in accordance with an exemplary embodiment of this invention.
Figure 2:
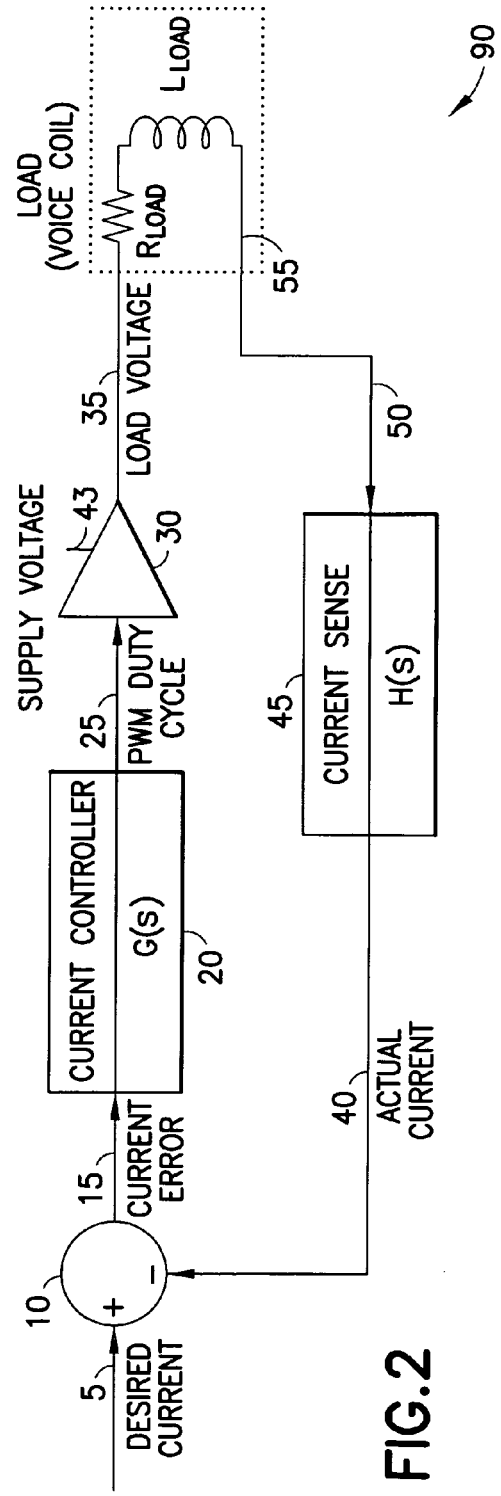
FIG. 2 depicts a simplified block diagram of a controller in accordance with an exemplary embodiment of this invention.

Referring now to FIGS. 1 and 2, the basic structure of a controller in accordance with an exemplary embodiment of this invention is shown.

The voice coil control circuits 80 and 90 are shown. Desired current 5 and the feedback current 40 are inputs for adder 10 producing Current Error 15. Current Error 15 is then used by the current controller 20 to generate a PWM duty cycle 25. Current controller 20 may include computer instructions stored in memory (not shown) and run on a processor (not shown). The PWM duty cycle 25 is used by the PWM drive circuit 30 with a supply voltage 43 to generate the load voltage 35. The load 55, which may generate output Y(s) 60 results in feedback 50. Current sensor 45 then detects the load current from feedback 50 and produces feedback current 40

For a minimal closed-loop current controller 20, the desired current 5 (command) is compared to the actual current 40 (feedback), which generates a current error, this error is used to drive a control algorithm. For a current controller 20 whose output is a pulse width modulation (PWM) duty cycle 25, the PWM signal 25 is passed to a power amplifier 30 (such as an H-Bridge or equivalent) and toggles the load voltage 35 from the maximum supply to the minimum supply. For this reason, the voltage applied to the coil 55 is equivalent to the duty cycle 25 in percent multiplied by the supply voltage. In this sense, the supply voltage acts as an analogue to a loop gain in the control loop.

The output 35 of this stage drives the load 55 (e.g., a voice coil). Closing the control loop is a current sensor 45, which generates a signal 40. This signal 40 is coordinated with the command signal 5

The current sense method and the current loop concept are well known in the art as evidenced by: Published U.S. Patent Application No. 2005/0092952, filed May 5, 2005, Published U.S. Patent Application No. 2006/0037467, filed Feb. 23, 2006; U.S. Provisional Application No. 60/854,562; U.S. Provisional Application No. 60/930,846; U.S. Pat. No. 5,960, 831, filed May 7, 1993, and U.S. Pat. No. 5,460,201, filed May 27, 1993.

The inductive load may be described by:

$$V_{Coil} = iR + L\frac{di}{dt} + \dot{x}K_{EMF} \qquad [\text{eq. 1}]$$

The coil voltage ($V_{Coil}$) is applied directly by the PWM amplifier 30 and is expressed as the following:

$$V_{Coil} = (\% \text{ DutyCycle})(V_{Supply}) \qquad [\text{eq. 2}]$$

Since the combination of % Duty Cycle and direction may be expressed as a ratio between −1.00 and 1.00, the result is an applied voltage to the coil 55 between $-V_{Supply}$ and $+V_{Supply}$.

From rest, if a voltage is applied to an inductive load, the current begins to rise (or fall) dependant on the load resistance (R), inductance (L), and supply voltage ($V_{Supply}$). Since most electro-mechanical devices have mechanical time constants that are much longer than the electrical time constant, rapid and small changes in the current produce a practically unnoticeable change in the mechanical system. See FIG. 3, which shows a graph of current in response to a square wave voltage applied to an inductive load.

Figure 3:
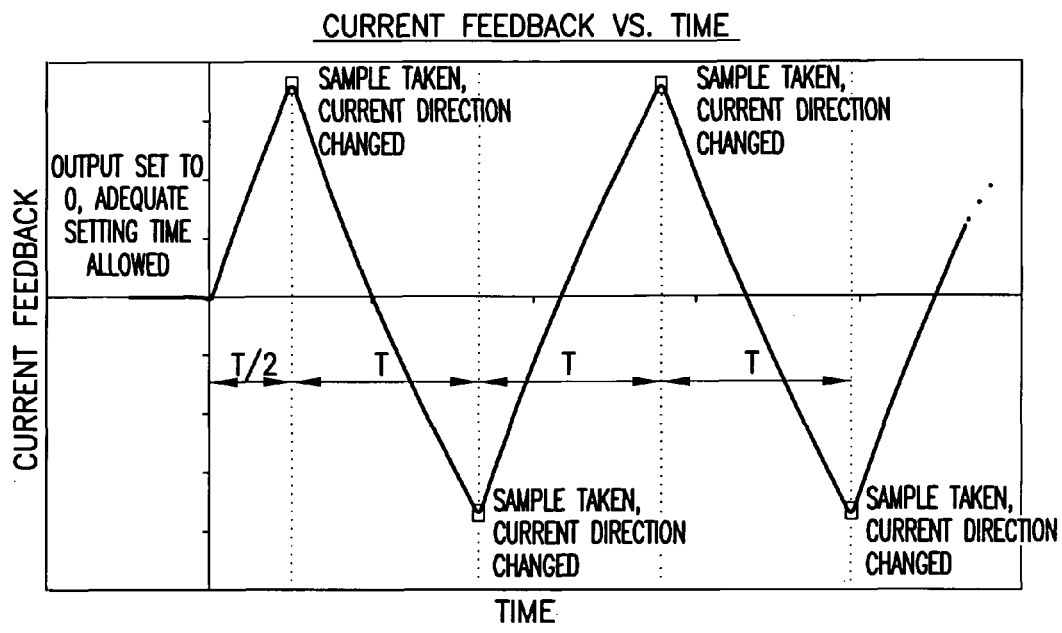
FIG. 3 shows a graph of current in response to a square wave voltage applied to an inductive load.

As shown in FIG. 3, the current in the load is allowed adequate settle time prior to time 0 while no voltage is applied. The current may be assumed to be zero at time 0 or the current may be sensed. After a time interval (T/2), the current is sensed and the current direction is changed (e.g., at an edge of the square wave). Then an iterative process begins where, after each of new time interval (T), the current is sensed and the current direction is changed.

The time constant, $\tau$, of a real inductive load can be expressed by:

$$\tau = \frac{1}{\lambda} = \frac{L}{R} \quad [\text{eq. 3}]$$

From this relationship and the above relationship (assuming no short term mechanical motion), we can conclude that the voltage across an inductive/resistive load will behave as follows to a step input:

$$I_{Coil} = \frac{V_{Supply}}{R}(1 - e^{-\lambda t}) \quad [\text{eq. 4}]$$

For a fixed time pulse duration, the load current, $I_{Coil}$, will be higher for higher supply voltages, higher values of resistance, or lower values of inductance (assuming the time constant is at least twice that of the pulse width).

Figure 5:
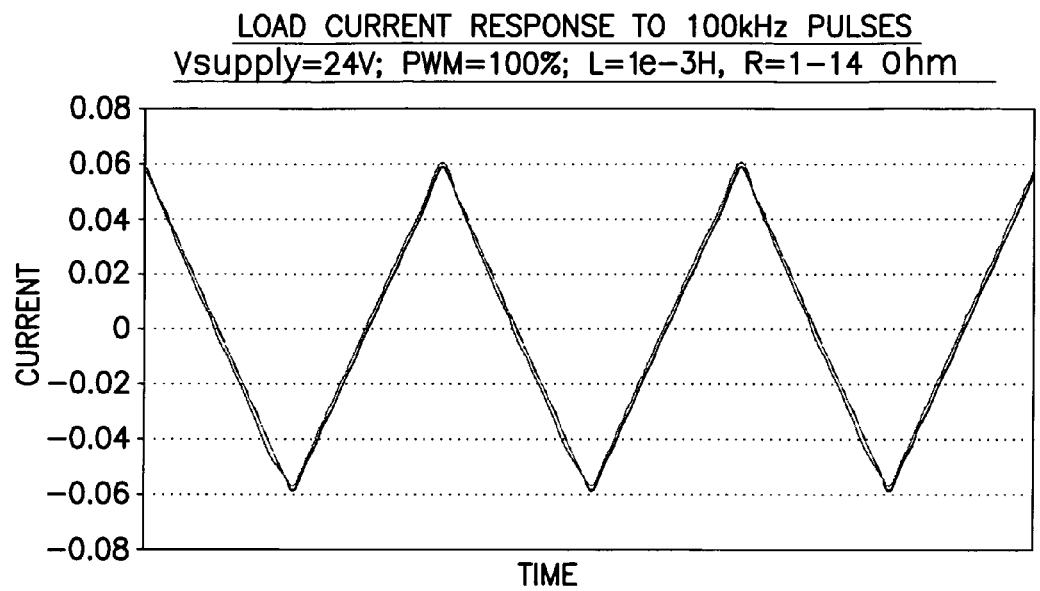
FIG. 5 illustrates a plot of current vs. time for varying resistances.

As shown in FIG. 5, the resistance does not affect the transient response of the coil current to external pulse stimulation. Under long term conditions, the SS $I_{Coil}$ will be determined by $V_{coil}/R$, in which case, SS $I_{coil}$ will be higher for lower values of resistance. This may be counter-intuitive as the time-constants ($\tau$ and $\lambda$) are proportional to inductance and resistance. However, this enables determining a value of the current and a rate of change of the current which are independent of coil resistance.

Assuming a constant supply voltage and a constant inductance, when performing the initiation of a transient until time approaches infinity:

1) As the resistance goes up, the long term SS coil current will tend to be lower but the effect on $\tau$ from the increased resistance will cause the rate of change of the current to be higher. The SS currents may settle at different long term values, however, the response of both systems in the short term is effectively indistinguishable.

2) As resistance goes down, the resultant SS current value goes up, but the current rise will respond more slowly due to the effects on $\tau$.

Additionally, the pulse applied could be PWM based to reduce the effective voltage applied to the load. Combining these effects the following relationship may be used to model the inductive load:

$$I_{Coil} = \frac{(\% \ DutyCycle)V_{Supply}}{R}\left[1 - e^{-\frac{R}{L}t}\right], t \geq 0 \quad [\text{eq. 5}]$$

Plant Characterization of an Exemplary Embodiment

The following details an initialization method of identifying the plant without adding any new hardware.

When a PWM command of a chosen % Duty Cycle is invoked (at t=0 ms with i(0)=0 A), the current through the inductor rises as described by eq. 5. Initially, only % Duty Cycle and t are known by the microcontroller (since Duty Cycle is set by the microcontroller and the time that the pulse is provided can be measured and/or controlled by the microcontroller). Also, $I_{Coil}$ can be found at any time by reading the current feedback signal 40. If an adequate amount of time is allowed to elapse (longer than 6R/L), then the current feedback, $I_{Coil-SS}$ will be steady state and equivalent to:

$$I_{Coil-SS} = \frac{(\% \ DutyCycle)V_{Supply}}{R} \quad [\text{eq. 6}]$$

By incorporating an algorithm to excite the load with a known duty cycle signal for a known period of time and measuring the load current at the end of the transient, a lumped plant characteristic may be calculated based on the rate of change of the current during that time interval.

In such a control systems scheme, it is often the rate of change of the controlled variable that determines how controllable a system is for a given controller. By measuring the current rise after a specified period of time the average rate of change of the current is found. This rate may be used to determine how responsive the plant is (in this case, responsiveness is directly affected by $V_{Supply}$, and inductance).

For a given supply voltage and inductance, the load resistance has no effect on responsiveness since the maximum attainable current (steady-state) and the time-constant are affected by changes in resistance and in the opposite directions; consequently effectively canceling. For higher values of resistance, a lower maximum current is possible with a given supply voltage, therefore current related to time would tend to be lower for all points in time. However, with higher resistance values, the time constant is shorter which tends to increase the current level for each instant in time. It should be appreciated by those skilled in the relevant arts that these effects cancel in magnitude.

Figure 4:
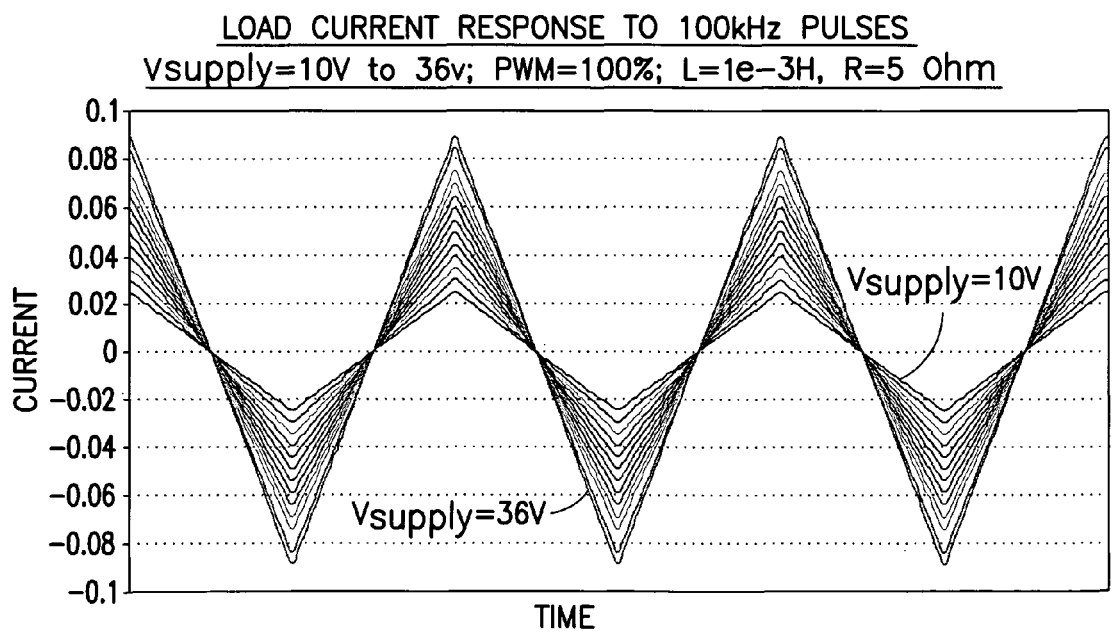
FIG. 4 illustrates a plot of current vs. time for varying supply voltages.
Figure 6:
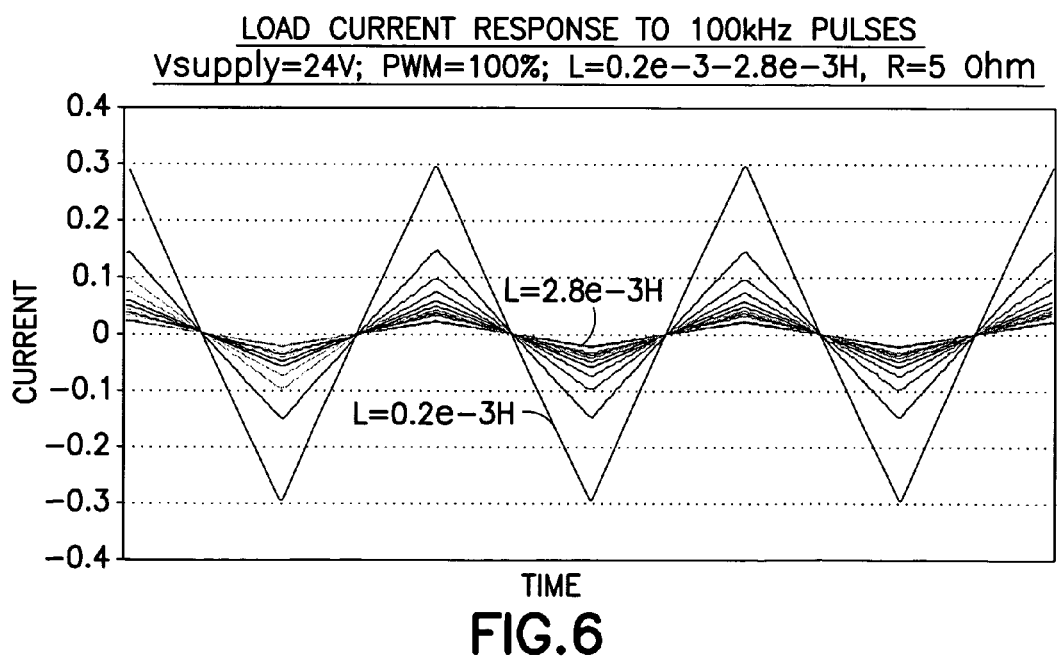
FIG. 6 illustrates a plot of current vs. time for varying inductances.

FIGS. 4, 5, and 6 depict several plots which illustrate this point.

In FIG. 5, the varying resistance plot, the pseudo-triangle waves created lay on top of one-another. Also note the scale in the varying inductance plot, FIG. 6, and varying supply voltage plot, FIG. 4.

Larger supply voltages create larger inductive load excursions and smaller values of inductance produce similarly large magnitudes of load current excursions (in fact, a 0.6 mH inductor with 24V supply has a nearly identical current excursion as a 1 mH inductor with a 36V supply). The relationship between supply voltage and magnitude of current excursion is linear while the relationship is non-linear with inductance.

Figure 7:
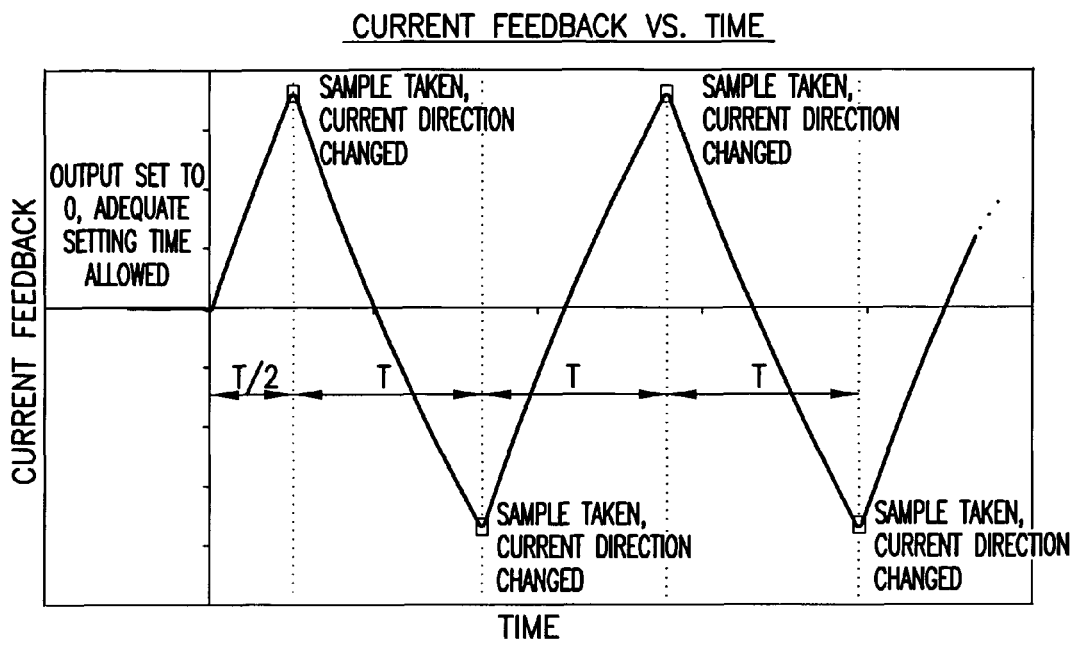
FIG. 7 illustrates a plot of current feedback vs. time in accordance with an exemplary embodiment of this invention.
Figure 8:
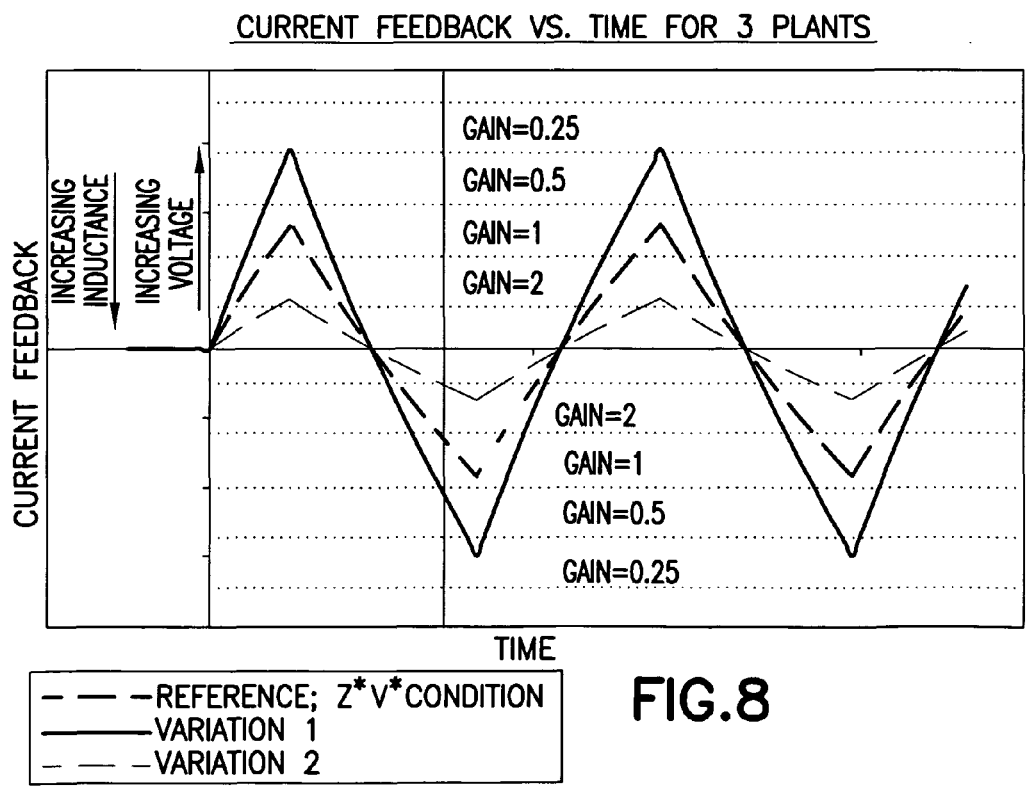
FIG. 8 illustrates a plot of current feedback vs. time for 3 plants.

Referring now to FIGS. 7 and 8, a sample of the inductive load current at the end of an excursion (before the excitation polarity is switched) may obtain a relative measure of the 'responsiveness' of the electrical component of the load relatively simply and quickly with minimal impact on the mechanical elements of the system. The combined effects of inductance and supply voltage manifest as load current excursions of some magnitude that is related to inductance and supply voltage.

Compensating for differences in supply voltage as well as motor design, construction, or manufacturing differences in the inductive load enables control of the current in the inductive load.

When G(s) is implemented by a microcontroller, an initialization procedure that uses the open-loop response of the voice coil current may be used to compensate for specific plant parameters. Typically, the output of the microcontroller will be a PWM signal 35 which is the output of the microcontroller control system and the input to a PWM driver 30.

Controller architecture is selected for the fundamental characteristics of the plant (in this case, an inductive load 55).

The controller 20 issues a known duty cycle (between 0% and up to and including 100%) step command to the system to excite it. A predetermined time interval is allowed to elapse. During this time, the current in the inductive load 55 begins to rise. At the end of this time interval (which is well before the current reaches steady state), a current measurement is taken. This procedure may be done many times by changing the magnitude or direction of the current at the end of the interval and allowing current to decay for the same interval.

Figure 9:
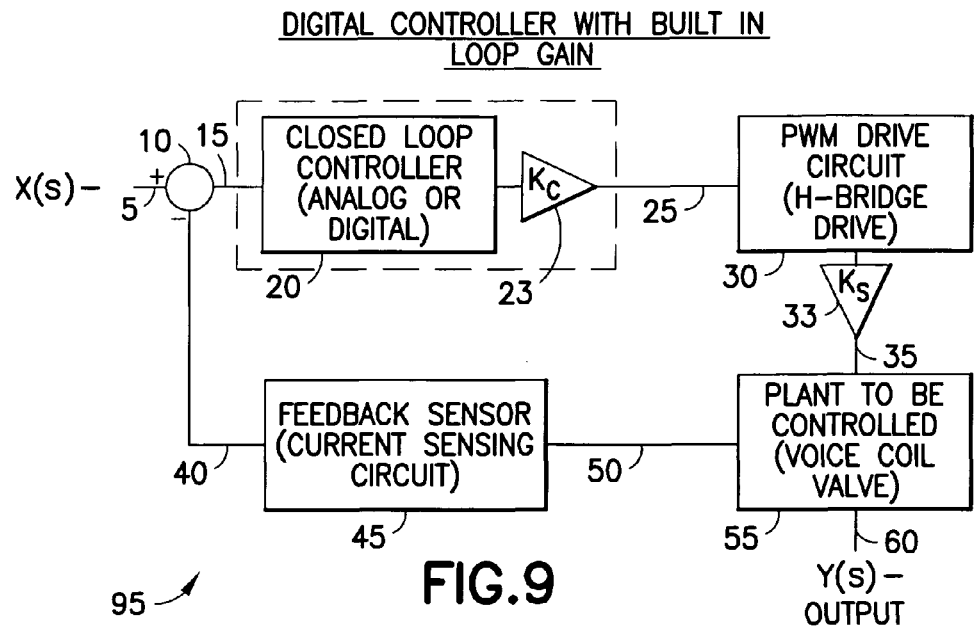
FIG. 9 depicts a simplified block diagram of an embodiment of a controller in accordance with an exemplary embodiment of this invention.

At this point, there are several options for compensation, including those outlined below. It should be appreciated by those skilled in the relevant arts that other compensation techniques known in the art may be used in accordance with an exemplary embodiment of this invention Compensation Techniques of an Exemplary Embodiment Additional Loop Gain One method for compensation is to add in an additional loop gain which counteracts the combined effects of variance in load and supply voltage. An illustration of this concept is shown in FIG. 9, showing control circuit 95 which includes $K_C$ 23 and $K_S$ 33. In a non-limiting embodiment, $K_C \times K_S$ is set to equal 1 (or nearly 1 for simplified systems).

Once the sensing in the initialization routine has completed, the amplitude of the samples taken is used to determine (via either a lookup table or calculation) an additional loop gain that will yield acceptable transient response and stability. This initialization may also detect faults if the current rises/decays too quickly (over-current due to electrical short, voltage being too high or impedance being too low) or too slowly/not at all (low voltage or open load). This loop gain can then be passed to the control algorithm, which is designed to accept an additional loop gain parameter.

A non-limiting, exemplary method to calculate the gain value is to measure the value of the current after a pre-determined length of time. For a given set of conditions (e.g., 1 mH, 24 V), after 10 usec the current may change by 120 mA each time the direction switches. If the coil is excited for equal lengths of time with 10 us positive and 10 us negative alternating voltages, then an expected triangle wave current profile with +60 mA peak positive current and −60 mA peak negative current may develop. The value of the coil current may be sampled immediately before switching direction several times in order to get a representative sample. The value of the peak current may be calculated and a ratio of expected divided by actual (e.g., 60/45) may be used to produce a 'correction gain' value (e.g., of 1.33).

From this point forward, if the control system is requesting a particular PWM value, (e.g., 40%), the algorithm may correct this value by $K_S$ (e.g., 40% become 40%×1.33=53.33%). This ensures that appropriate PWM values (and in turn, drive voltages) are provided to the load to produce tolerable and controllable current excursions independent of the load inductive characteristics or supply voltage value over a wider range of load characteristic values than would otherwise be achievable.

Alternatively, more complex approaches may be implemented to compensate periodically during operation so that the most accurate compensation value is used at all times (characterization is conducted real-time, live). This ensures that changes in inductance or supply voltage that may occur after initialization are properly compensated for during operation.

Scaled PWM Duty Cycle to Achieve Known Rise Response

Figure 10:
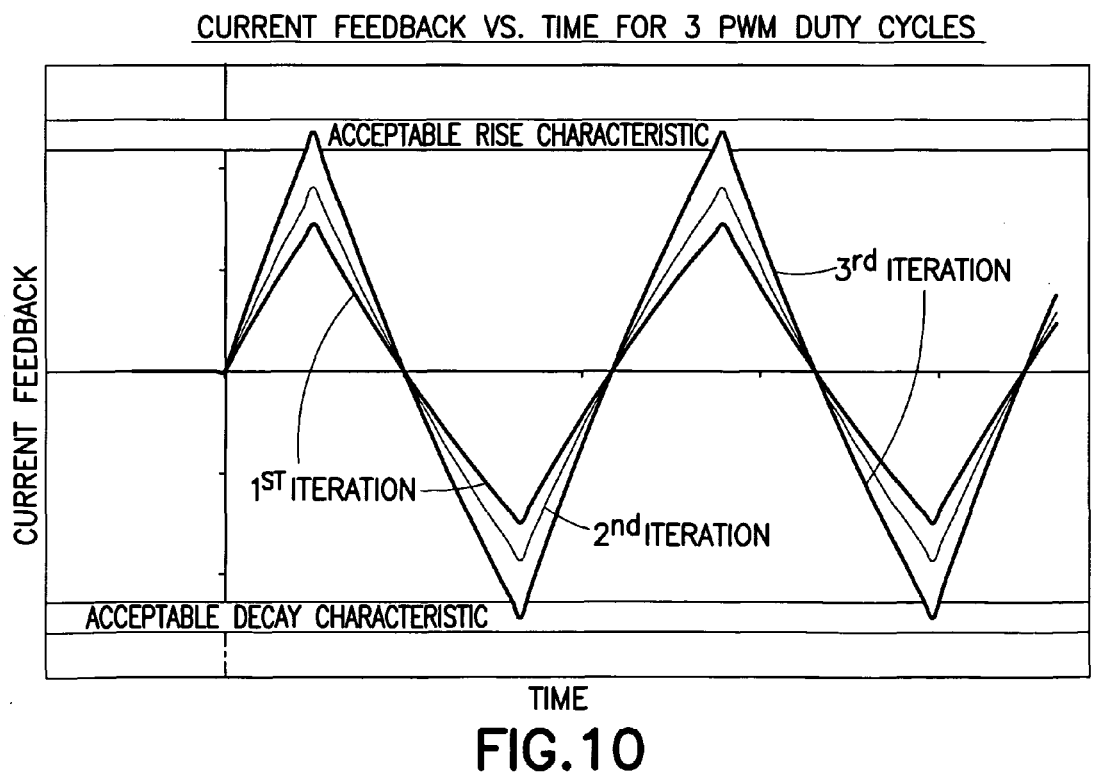
FIG. 10 illustrates a plot of current feedback vs. time for 3 PWM duty cycles.

Another method for characterization is to define a band of acceptable current rise/decay characteristics. The amplitude of the step used in the sensing routine is adjusted in several iterations until the peak current feedback samples taken falls within a predetermined window. This window will be chosen such that all plants whose rise/decay characteristics fall in this window will yield acceptable performance with the controller designed (see FIG. 10). Once a PWM duty cycle is found that meets these criteria, this duty cycle (or a similar measurement) can be passed to the control algorithm, which is designed to scale the output PWM duty cycle. This enables the control system to have fixed control system gains independent of the architecture (e.g., proportional-integral-derivative (PID) or modified PID) that can be selected to obtain ideal performance for the product, while requiring only a single compensation gain for widely variable plant parameters. Furthermore, this compensation value may be determined automatically during initialization or continuously with minimal impact on the operation of the system and virtually imperceptible to the end-user.

Sweep of Cycle Frequency

As can be seen, exemplary embodiments of the invention allow for a device for controlling load and voltage in a voice coil. The device includes a detector configured to detect the current in the system. The current is used in a processor/controller to calculate a lumped term, which accounts for the resistance, inductance, and supply voltage in the load. Using this term, the control algorithm is modified to control the performance of a set variable in the load, such as coil current.

By combining the above mentioned advantages, the plant parameters may be determined by changing the length of time the voltage waveform is full positive and full negative. By initiating a transient (full positive) the current will rise at a rate determined by the plant parameters. The applied voltage may then be switched after a pre-determined length of time (which may initially be a relatively short period of time) and a sample of coil current may be taken. After several successive polarity switches and current samples have been taken it may be determined that the step time is too short to reach a defined current magnitude. The step time length may be incrementally increased to allow current to rise to a higher level before switching; this process is repeated until the current rises to a pre-defined window. The length of time required to achieve this window level may be used to modify the controller gains.

Figure 11:
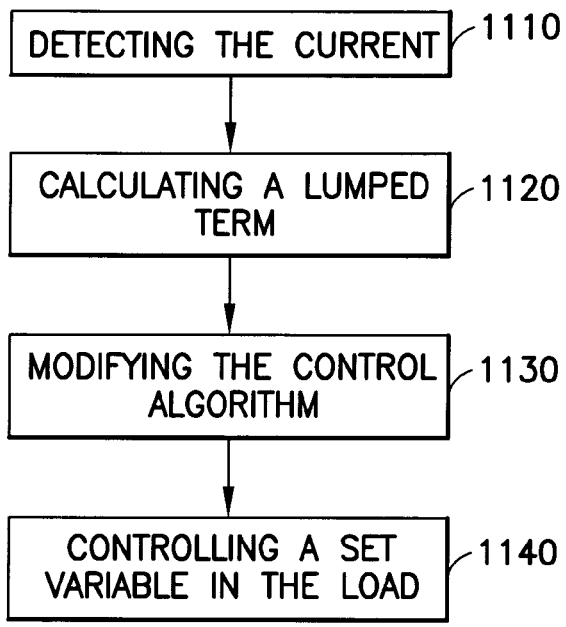
FIG. 11 shows a simple flow diagram of a method in accordance with an exemplary embodiment of this invention.

In one non-limiting, exemplary embodiment, and as illustrated in FIG. 11, a method is provided. The method includes detecting the current in the system at block 1110. At block 1120, the current is used in calculating a lumped term, which accounts for the resistance, inductance, and supply voltage in the load. Using this term, the control algorithm is modified, at block 1130, to control the performance of a set variable in the load, such as coil current at block 1140.

Figure 12:
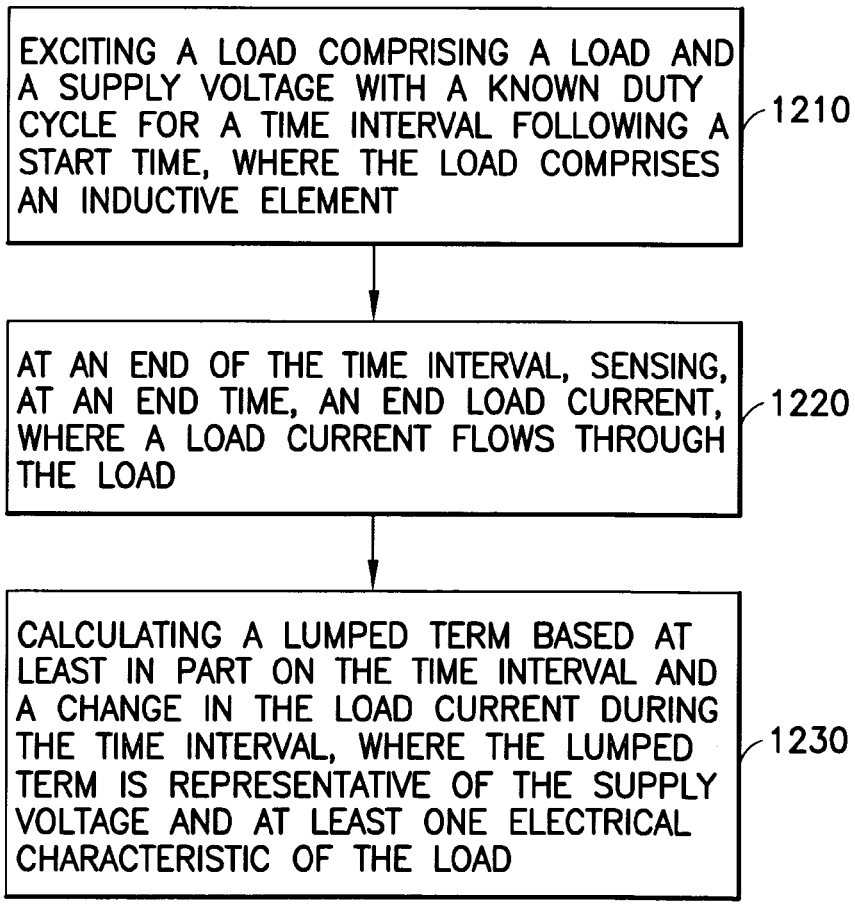
FIG. 12 shows a simple flow diagram of another method in accordance with an exemplary embodiment of this invention.

FIG. 12 shows a simple flow diagram of another method in accordance with an exemplary embodiment of this invention, where the method is for sensing and compensating for variances in load and voltage in a closed loop voice coil current controller. At block 1210, the method includes exciting a load in a system comprising a load and a supply voltage with a known duty cycle for a time interval following a start time, where the load comprises an inductive element. At an end of the time interval, sensing, at an end time, an end load current, where a load current flows through the load at block 1220. Calculating a lumped term based at least in part on the time interval and a change in the load current during the time interval, where the lumped term is representative of the supply voltage and at least one electrical characteristic of the load is included in the method at block 1230.

An exemplary embodiment in accordance with this invention is a method for sensing and compensating for variances in load and voltage in a closed loop voice coil current controller. The method includes exciting a load in a system including a load and a supply voltage with a known duty cycle for a time interval following a start time. The load includes an inductive element. At an end of the time interval, sensing, at an end time, an end load current which flows through the load is also included in the method. The method also includes calculating a lumped term based at least in part on the time interval and a change in the load current during the time interval. The lumped term is representative of the supply voltage and one or more electrical characteristic of the load.

In a further exemplary embodiment of the method above, the end time is a prior end time, the known duty cycle is a prior known duty cycle having a first polarity, the end load current is a prior end load current and the method also includes iteratively: exciting the load with a new known duty cycle having a second polarity for a new time interval following the prior end time, where the first polarity is opposite of the second polarity; at the end of the new time interval, sensing, at a new end time, a new end load current in the system; and re-calculating the lumped term based at least in part on the prior end load current, the new end load current and the new time interval.

In an additional exemplary embodiment of any one of the methods above, the method also includes generating a control signal based at least in part on the lumped term. The control signal is configured to control a voltage applied to the load.

In a further exemplary embodiment of the method above, the control signal is representative of a pulse width modulation, and the method also includes providing the control signal to a pulse width modulation circuit to control a duty cycle of the pulse width modulation signal.

In an additional exemplary embodiment of any one of the methods above, generating the control signal compensates for changes in one or more of the supply voltage and the one or more electrical characteristic.

In a further exemplary embodiment of any one of the methods above, generating the control signal includes controlling the voltage applied to the load such that the load current is within a range of acceptable currents at given time intervals.

In an additional exemplary embodiment of any one of the methods above, the method also includes receiving an indication of a desired current. Generating the control signal is also based on the desired current.

In a further exemplary embodiment of any one of the methods above, the inductive element includes a winding of a direct current motor, a solenoid and/or a voice coil.

In an additional exemplary embodiment of any one of the methods above, the inductive element is a part of a valve.

In a further exemplary embodiment of any one of the methods above, calculating the lumped term is not based on values of the supply voltage and the one or more electrical characteristic.

In an additional exemplary embodiment of any one of the methods above, the time interval is less than the time needed for the system to reach a steady state.

In a further exemplary embodiment of any one of the methods above, the one or more electrical characteristics include a resistance in the load and/or an inductance in the load.

An additional exemplary embodiment in accordance with this invention is an apparatus for sensing and compensating for variances in load and voltage in a closed loop voice coil current controller. The apparatus includes an input configured to receive a detected current flowing through a load of a system, where the load comprises an inductive element. An output configured to provide a signal configured to excite the load is also included in the apparatus. The apparatus includes a controller configured to: excite the load with a known duty cycle for a time interval following a start time; at an end time at an end of the time interval, receive a sensed end current flowing through the load; and calculate a lumped term based at least in part on the time interval and a change in the load current during the time interval. The lumped term is representative of the supply voltage and at least one electrical characteristic of the load.

In a further exemplary embodiment of the apparatus above, the end time is a prior end time, the known duty cycle is a prior known duty cycle having a first polarity, the end load current is a prior end load current and the controller is also configured to iteratively: excite the load with a new known duty cycle having a second polarity for a new time interval following the prior end time, where the first polarity is opposite of the second polarity; at a new end time at the end of the new time interval, sense a new end load current; and re-calculate the lumped term based at least in part on the prior end load current, the new end load current and the new time interval.

In an additional exemplary embodiment of any one of the apparatus above, the controller is also configured to generate a control signal based at least in part on the lumped term. The control signal is configured to control a voltage applied to the load.

In a further exemplary embodiment of the apparatus above, the control signal is representative of a pulse width modulation, and the output is also configured to provide the control signal to a pulse width modulation circuit to control a duty cycle of the pulse width modulation signal.

In an additional exemplary embodiment of any one of the apparatus above, the controller is also configured to generate the control signal in order to compensate for changes in the supply voltage and/or the one or more electrical characteristic.

In a further exemplary embodiment of any one of the apparatus above, the controller is also configured to generate the control signal to control the voltage applied to the load such that the load current is within a range of acceptable currents at given time intervals.

In an additional exemplary embodiment of any one of the apparatus above, the apparatus also includes another input configured to receive an indication of a desired current. Generating the control signal is also based on the desired current.

In a further exemplary embodiment of any one of the apparatus above, the inductive element includes a winding of a direct current motor, a solenoid and/or a voice coil.

In an additional exemplary embodiment of any one of the apparatus above, the inductive element is a part of a valve.

In a further exemplary embodiment of any one of the apparatus above, calculating the lumped term is not based on values of the supply voltage and the one or more electrical characteristic.

In an additional exemplary embodiment of any one of the apparatus above, the time interval is less than the time needed for the system to reach a steady state.

In a further exemplary embodiment of any one of the apparatus above, the one or more electrical characteristics include a resistance in the load and/or an inductance in the load.

An additional exemplary embodiment in accordance with this invention is a computer-readable medium tangibly encoding a computer program comprising program instructions, execution of the program instructions resulting in operations for sensing and compensating for variances in load and voltage in a closed loop voice coil current controller. The instructions include exciting a load in a system including a load and a supply voltage with a known duty cycle for a time interval following a start time. The load includes an inductive element. At an end of the time interval, sensing, at an end time, an end load current which flows through the load is also included in the instructions. The instructions also include calculating a lumped term based at least in part on the time interval and a change in the load current during the time interval. The lumped term is representative of the supply voltage and one or more electrical characteristic of the load.

In a further exemplary embodiment of the computer-readable medium above, the end time is a prior end time, the known duty cycle is a prior known duty cycle having a first polarity, the end load current is a prior end load current and the instructions also include iteratively: exciting the load with a new known duty cycle having a second polarity for a new time interval following the prior end time, where the first polarity is opposite of the second polarity; at the end of the new time interval, sensing, at a new end time, a new end load current in the system; and re-calculating the lumped term based at least in part on the prior end load current, the new end load current and the new time interval.

In an additional exemplary embodiment of any one of the computer-readable media above, the instructions also include generating a control signal based at least in part on the lumped term. The control signal is configured to control a voltage applied to the load.

In a further exemplary embodiment of the computer-readable medium above, the control signal is representative of a pulse width modulation, and the instructions also include providing the control signal to a pulse width modulation circuit to control a duty cycle of the pulse width modulation signal.

In an additional exemplary embodiment of any one of the computer-readable media above, generating the control signal compensates for changes in one or more of the supply voltage and the one or more electrical characteristic.

In a further exemplary embodiment of any one of the computer-readable media above, generating the control signal includes controlling the voltage applied to the load such that the load current is within a range of acceptable currents at given time intervals.

In an additional exemplary embodiment of any one of the computer-readable media above, the instructions also include receiving an indication of a desired current. Generating the control signal is also based on the desired current.

In a further exemplary embodiment of any one of the computer-readable media above, the inductive element includes a winding of a direct current motor, a solenoid and/or a voice coil.

In an additional exemplary embodiment of any one of the computer-readable media above, the inductive element is a part of a valve.

In a further exemplary embodiment of any one of the computer-readable media above, calculating the lumped term is not based on values of the supply voltage and the one or more electrical characteristic.

In an additional exemplary embodiment of any one of the computer-readable media above, the time interval is less than the time needed for the system to reach a steady state.

In a further exemplary embodiment of any one of the computer-readable media above, the one or more electrical characteristics include a resistance in the load and/or an inductance in the load.

An additional exemplary embodiment in accordance with this invention is an apparatus for sensing and compensating for variances in load and voltage in a closed loop voice coil current controller. The apparatus includes means for exciting a load in a system including a load and a supply voltage with a known duty cycle for a time interval following a start time. The load includes an inductive element A means for sensing, at an end of the time interval, at an end time, an end load current which flows through the load is also included in the apparatus. The apparatus also includes means for calculating a lumped term based at least in part on the time interval and a change in the load current during the time interval. The lumped term is representative of the supply voltage and one or more electrical characteristic of the load.

In a further exemplary embodiment of the apparatus above, the end time is a prior end time, the known duty cycle is a prior known duty cycle having a first polarity, the end load current is a prior end load current and the means for exciting are also for iteratively exciting the load with a new known duty cycle having a second polarity for a new time interval following the prior end time, where the first polarity is opposite of the second polarity and the means for calculating is also for recalculating the lumped term based at least in part on the prior end load current, the new end load current and the new time interval.

In an additional exemplary embodiment of any one of the apparatus above, the apparatus also includes means for generating a control signal based at least in part on the lumped term. The control signal is configured to control a voltage applied to the load.

In a further exemplary embodiment of the apparatus above, the control signal is representative of a pulse width modulation, and the apparatus also includes means for providing the control signal to a pulse width modulation circuit to control a duty cycle of the pulse width modulation signal.

In an additional exemplary embodiment of any one of the apparatus above, the means for generating the control signal compensates for changes in one or more of the supply voltage and the one or more electrical characteristic.

In a further exemplary embodiment of any one of the apparatus above, the means for generating the control signal is configured to control the voltage applied to the load such that the load current is within a range of acceptable currents at given time intervals.

In an additional exemplary embodiment of any one of the apparatus above, the apparatus also include means for receiving an indication of a desired current. Generating the control signal is also based on the desired current.

In a further exemplary embodiment of any one of the apparatus above, the inductive element includes a winding of a direct current motor, a solenoid and/or a voice coil.

In an additional exemplary embodiment of any one of the apparatus above, the inductive element is a part of a valve.

In a further exemplary embodiment of any one of the apparatus above, calculating the lumped term is not based on values of the supply voltage and the one or more electrical characteristic.

In an additional exemplary embodiment of any one of the apparatus above, the time interval is less than the time needed for the system to reach a steady state.

In a further exemplary embodiment of any one of the apparatus above, the one or more electrical characteristics include a resistance in the load and/or an inductance in the load.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors and a digital signal processor or processors that are configurable so as to operate in accordance with the exemplary embodiments of this invention.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
exciting a load in a system comprising the load and a supply voltage having a first polarity with a known first duty cycle for a first time interval following a start time, where the load comprises an inductive element;
at an end of the first time interval, sensing, at a first end time, a first end load current, where a first load current flows through the load; and
calculating a lumped term based at least in part on the first time interval and a change in the first load current during the first time interval, where the lumped term is representative of the supply voltage and at least one electrical characteristic of the load;
exciting the load with a second known duty cycle having an opposite polarity to the first polarity for a second time interval following the first end time;
at the end of the second time interval, sensing, at a second end time, a second end load current in the system; and
re-calculating the lumped term based at least in part on the first end load current, the second end load current and the second time interval.

2. The method of claim 1, further comprising generating a control signal based at least in part on the lumped term, where the control signal is configured to control a voltage applied to the load.

3. The method of claim 2, where the control signal is representative of a pulse width modulation, and the method further comprises providing the control signal to a pulse width modulation circuit to control a duty cycle of the pulse width modulation signal.

4. The method of claim 2, where generating the control signal compensates for changes in at least one of the supply voltage and the at least one electrical characteristic.

5. The method of claim 2, where generating the control signal comprises controlling the voltage applied to the load such that the load current is within a range of acceptable currents at given time intervals.

6. The method of claim 2, further comprising receiving an indication of a desired current, where generating the control signal is further based on the desired current.

7. The method of claim 1, where the inductive element comprises at least one of a winding of a direct current motor, a solenoid and a voice coil.

8. The method of claim 1, where the inductive element comprises a part of a valve.

9. The method of claim 1, where the time interval is less than the time needed for the system to reach a steady state.

10. The method of claim 1, where the at least one electrical characteristic comprises at least one of a resistance in the load and an inductance in the load.

11. An apparatus comprising:
an input configured to receive a detected current flowing through a load of a system, where the load comprises an inductive element;
an output configured to provide a signal configured to excite the load; and
a controller configured to:
excite the load with a first known duty cycle having a first polarity for a first time interval following a start time;
at an end of the first time interval, receive a sensed first end current flowing through the load; and
calculate a lumped term based at least in part on the first time interval and a change in the first load current during the first time interval,
where the lumped term is representative of the supply voltage and at least one electrical characteristic of the load;
excite the load with a second known duty cycle having an opposite polarity to the first polarity for a second time interval following the first end time;
at a second end time at the end of the second time interval, sense a second end load current; and
re-calculate the lumped term based at least in part on the first end load current, the second end load current and the second time interval.

12. The apparatus of claim 11, where the controller is further configured to generate a control signal based at least in part on the lumped term, where the control signal is configured to control a voltage applied to the load.

13. The apparatus of claim 12, where the controller is further configured to receive an indication of a desired current and to generate the control signal based at least in part on the desired current.

14. A computer program product embodied on a non-transitory computer-readable medium tangibly encoding a computer program comprising program instructions, wherein execution of the program instructions by a computer results in performing or controlling operations comprising:
exciting a load in a system comprising the load and a supply voltage with a known first duty cycle having a first polarity for a first time interval following a start time, where the load comprises an inductive element;
at an end of the first time interval, sensing, at a first end time, a first end load current, where a first load current flows through the load; and
calculating a lumped term based at least in part on the first time interval and a change in the first load current during the first time interval, where the lumped term is representative of the supply voltage and at least one electrical characteristic of the load;
exciting the load with a second known duty cycle having an opposite polarity to the first polarity for a second time interval following the first end time;
at the end of the second time interval, sensing, at a second end time, a second end load current in the system; and
re-calculating the lumped term based at least in part on the first end load current, the second end load current and the second time interval.

15. An apparatus comprising:
means for exciting a load in a system comprising the load and a supply voltage with a known duty cycle having a first polarity for a first time interval following a start time, where the load comprises an inductive element;
means for sensing, at an end time of the first time interval, a first end load current, where a load current flows through the load; and means for calculating a lumped term based at least in part on the first time interval and a change in the first load current during the first time interval, where the lumped term is representative of the supply voltage and at least one electrical characteristic of the load, where the means for exciting the load is further iteratively exciting the load with a second known duty cycle having an opposite polarity to the first polarity for a second time interval following the first end time, and where the means for calculating the lumped term is further re-calculating the lumped term based at least in part on the first end load current, the second end load current and the second time interval.

* * * * *